United States Patent [19]

Matsuno

[11] Patent Number: 5,537,685
[45] Date of Patent: Jul. 16, 1996

[54] METHOD OF ESTABLISHING INTER-BASE-STATION SYNCHRONIZATION AND MOBILE RADIO COMMUNICATION SYSTEM USING THE METHOD

[75] Inventor: Keishi Matsuno, Tokyo, Japan

[73] Assignee: Nippon Steel Corporation, Tokyo, Japan

[21] Appl. No.: 132,247

[22] Filed: Oct. 6, 1993

[30] Foreign Application Priority Data

Oct. 7, 1992 [JP] Japan ................................. 4-293696
Dec. 25, 1992 [JP] Japan ................................. 4-359474

[51] Int. Cl.⁶ ................................................ H04B 7/26
[52] U.S. Cl. .................... 455/51.1; 455/56.1; 375/356; 370/103
[58] Field of Search .............................. 455/51.1, 51.2, 455/56.1, 67.1, 67.6; 370/100.1, 105, 103; 375/354, 355, 356

[56] References Cited

U.S. PATENT DOCUMENTS 4,718,109  1/1988  Breeden et al. .
4,939,752  7/1990  Literati et al. ........................ 455/51.1

FOREIGN PATENT DOCUMENTS 0197556  10/1986  European Pat. Off. .
0042995  2/1991  Japan ................................. 455/51.1
2241411  8/1991  United Kingdom .

OTHER PUBLICATIONS

Autonomous Inter–base–station Synchronization for TDMA Microcellular Systems, Akaiwa et al., The Institute of Electronic Information Communication Engineers in Japan, National Spring Meeting, 1991 B–334.
Improved Scheme of Autonomous Inter–base–station Synchronization, Akaiwa et al., "The Institute of Electronic Information Communication Engineers in Japan," National Autumn Meeting, 1991 B–251.
Transmitter Power Control Effect on Autonomous Reuse Partitioning, The Institute of Electronic Information Communication Engineers in Japan, Spring Meeting 1992, B–319.
Exact Radio Link Design in Cellular Mobile Communication Systems, Transactions of the Institute of Electronics and Information Communication Engineers in Japan (B), J71–B, No. 5, May 1988, pp. 633–639.

Autonomous Decentralized Inter–base–station Synchronization for TDMA Microcellular Systems, Akaiwa et al., IEEE 1991, pp. 257–262.

Autonomous Time Synchronization Among Radio Ports in Wireless Personal Communications, Justin C–I Chuang, IEEE May 1993, pp. 700–705.

Primary Examiner—Reinhard J. Eisenzopf
Assistant Examiner—Nguyen Vo
Attorney, Agent, or Firm—Pollock, Vande Sande & Priddy

[57] ABSTRACT

In a method of establishing synchronization between radio base stations in a mobile radio communication system, a control signal is transmitted at a predetermined time interval from each of the radio base stations and includes synchronization establishing information which indicates whether its own radio base station is in a first state in which synchronization has been established between the own radio base station and any other of the radio base stations or in a second state in which the synchronization has not yet been established. In a receiving radio base station, which is one of the radio base stations and has received the control signal transmitted from a transmitting radio base station, which is any other of the base stations it is determined, when the receiving radio base station is in the second state, whether the synchronization establishing information included in the received control signal indicates the first state or the second state. The method includes establishing synchronization in the receiving base station with the transmitting radio base station, when the synchronization establishing information included in the received control signal indicates the first state and setting, after establishing the synchronization with the transmitting radio base station, the synchronization establishing information included in the control signal transmitted from the receiving radio base station to indicate the first state.

22 Claims, 9 Drawing Sheets

METHOD OF ESTABLISHING INTER-BASE-STATION SYNCHRONIZATION AND MOBILE RADIO COMMUNICATION SYSTEM USING THE METHOD

BACKGROUND OF THE INVENTION

1. Field of the Invention

The present invention relates to a method of establishing inter-base-station synchronization in a mobile radio communication system operated in a time division multiple access (TDMA) mode or a code division multiple access (CDMA) mode and a mobile radio communication system using the method.

2. Description of the Related Art

In a mobile radio communication system, effective utilization of frequencies is achieved by utilizing the same frequency commonly at base stations in a plurality of remoted cells by a cellular system. Further, various types of systems for narrow-band transmission using signal compression and modulation-demodulation techniques are being studied, and utilization of a half rate of an audio codec is also studied in a digital system.

In such a situation, as a countermeasure to an increase of traffic, it is proposed in a mobile radio communication system, in particular in a mobile telephone system for automobiles, to gradually reduce service areas of respective radio base stations forming conventional large or medium zones, e.g., to areas each having a radius of 5 Km to 3 Km. The effective utilization of frequencies by forming smaller zones is useful especially in a personal radio communication system which is planned to be put into practical use. In this personal radio communication system, a small zone system is studied in which each zone has an area of several hundred meters to several tens of meters in the radius which is called a microcell or a picocell, as disclosed in the Transactions of the Institute of Electronics and Information Communication Engineers in Japan (B), J71-B, No. 5, May 1988 pp. 633–639.

In such a small zone system, the number of radio base stations sometimes becomes very large. Thus, it is planned to install these radio base stations on utility poles, building walls or the like. In this case, it is necessary to make the radio base station sharply more compact in size and lighter in weight, as well as to reduce the cost thereof. In such a small zone system, especially under free sale circumstances of the terminals including radio base stations, many radio base stations will be increased successively in order to cope with high traffic. This will result in the following problems.

Namely, when many radio base stations are installed successively, it is expected to form what is called a multizone where zones of adjacent radio base stations overlap each other so that the radiowave transmitted in one of the zones can be received in the other zone. In such a multizone, probability of loss in telephone communication is increased with the increase of interference by an adjacent radio base station, and calling becomes impossible at the worst. When a TDMA system is adopted in such a multizone, it is required to establish synchronization between frames used by respective radio base stations provided in contiguous zones forming a multizone, in order to assure functions of detecting and/or avoiding interference, that is, to cause the radio base station in each zone to perform telephone communication with a mobile station located in that zone at the same frame timing as that at which the adjacent base station performs its telephone communication, as disclosed in "Autonomous Decentralized Inter-Base-Station Synchronization for TDMA Microcellular Systems" Akaiwa et al IEEE 1991 pp. 257–262. As to the necessity of synchronization between radio base stations, it has been reported that the efficiency in using the slots is lowered by 25% to 30% in an asynchronous condition as compared with that in a synchronous condition.

When it is intended to realize synchronization between the adjacent radio base stations based on the control from a higher rank exchange like a telephone system for automobiles, following problems are caused. Firstly, many control signal lines are required for connecting each of the radio base stations with the exchange, thus causing a rise in equipment cost. Secondly, a large-sized computer coping with a large load for synchronization is necessary in the exchange side, and hardware for establishing synchronization is also necessary at the side of each radio base station, thus also causing a rise in equipment cost. Thirdly, in the case of a personal handy phone "PHP" system, the following problems are caused.

Namely, the PHP is applied to indoor mobile terminals in offices or homes and outdoor mobile terminals for public telephone communication. In offices, a business cordless telephone system called a behind PBX is introduced and the synchronization among respective radio base stations is established based on a command from the PBXo In this case, there is a problem that it is necessary to make the control signal common to the business cordless telephone system and the PHP system for synchronization between the radio base stations thereof and hence complicated processing is required every time a new radio base station is installed.

Further, since a plurality of communication enterprises sometimes use switching systems having different specifications in railway stations, airports or the like, complicated adjustment work requiring time and labor is necessary to unify specifications relating to synchronization control among respective switching systems.

SUMMARY OF THE INVENTION

It is an object of the present invention to provide a mobile radio communication system having a plurality of base stations forming a multizone in which inter-base-station synchronization is established by autonomous-control of respective base stations without relying on the control by a higher rank station in order to solve various problems, as mentioned above, in synchronization between radio base stations in a mobile radio communication system.

A method of establishing synchronization between radio base stations in a mobile radio communication system according to the present invention comprises the steps of: including, in a control signal transmitted at a predetermined time interval from each of the radio base stations, synchronization establishing information indicating whether the radio base station is in a first state in which synchronization has been established between the radio base station and any other one of the radio base stations or in a second state in which the synchronization has not yet been established; determining, in a receiving radio base station, which is one of the radio base stations and has received the control signal transmitted from a transmitting radio base station, which is any other one of the base stations, and when the receiving radio base station is in the second state, whether the synchronization establishing information included in the received control signal indicates the first state or the second state; establishing, in the receiving radio base station, synchronization with the transmitting radio base station, when it is determined that the synchronization establishing information included in the received control signal indicates the first state; and setting, after establishing the synchronization with the transmitting radio base station, the synchronization establishing information included in the control signal transmitted from the receiving radio base station to indicate the first state.

Further, in a mobile radio communication system having a plurality of radio base stations according to the present invention, each of the radio base stations comprises: means for including, in a control signal transmitted at a predetermined time interval from its own radio base station, synchronization establishing information indicating whether its own radio base station is in a first state in which synchronization has been established between its own radio base station and any other one of the radio base stations or in a second state in which the synchronization has not yet been established; means operative, when its own radio base station is a receiving radio base station which has received the control signal transmitted from a transmitting radio base station which is any other one of the radio base stations, for determining whether the synchronization establishing information included in the received control signal indicates the first state or the second state; means operative, when the radio base station is the receiving radio base station and in the second state, for establishing synchronization with the transmitting radio base station, when it is determined that the synchronization establishing information included in the received control signal indicates the first state; and means for setting, after establishing synchronization with the transmitting radio base station, the synchronization establishing information included in the control signal transmitted from the receiving radio base station to indicate the first state.

In a mobile radio communication system in general, each radio base station transmits a control signal such as a broadcast signal intermittently at a predetermined time interval within an allocated zone. The broadcast signal includes, for example, a transmitter identification signal for identifying the transmitting base station so that a mobile station located in a zone covered by the transmitting radio base station may confirm the present zone and a signal indicating various specifications employed. In the present invention, the radio base station which transmits the control signal includes in the control signal synchronization establishing information indicating whether the base station has established synchronization with another radio base station or not in the control signal. On the other hand, the base station, which has received the control signals and has not established synchronization with any other base station, establishes, when the synchronization establishing information included in the received control signal indicates that synchronization has been established, synchronization with the base station which has transmitted the control signal and sets the synchronization establishing information included in the control signal transmitted by itself to a state indicating that synchronization has been established. In such a manner, each radio base station can establish synchronization with another base station by autonomous-control without depending on a higher rank station.

DESCRIPTION OF THE PREFERRED EMBODIMENTS

Figure 8:
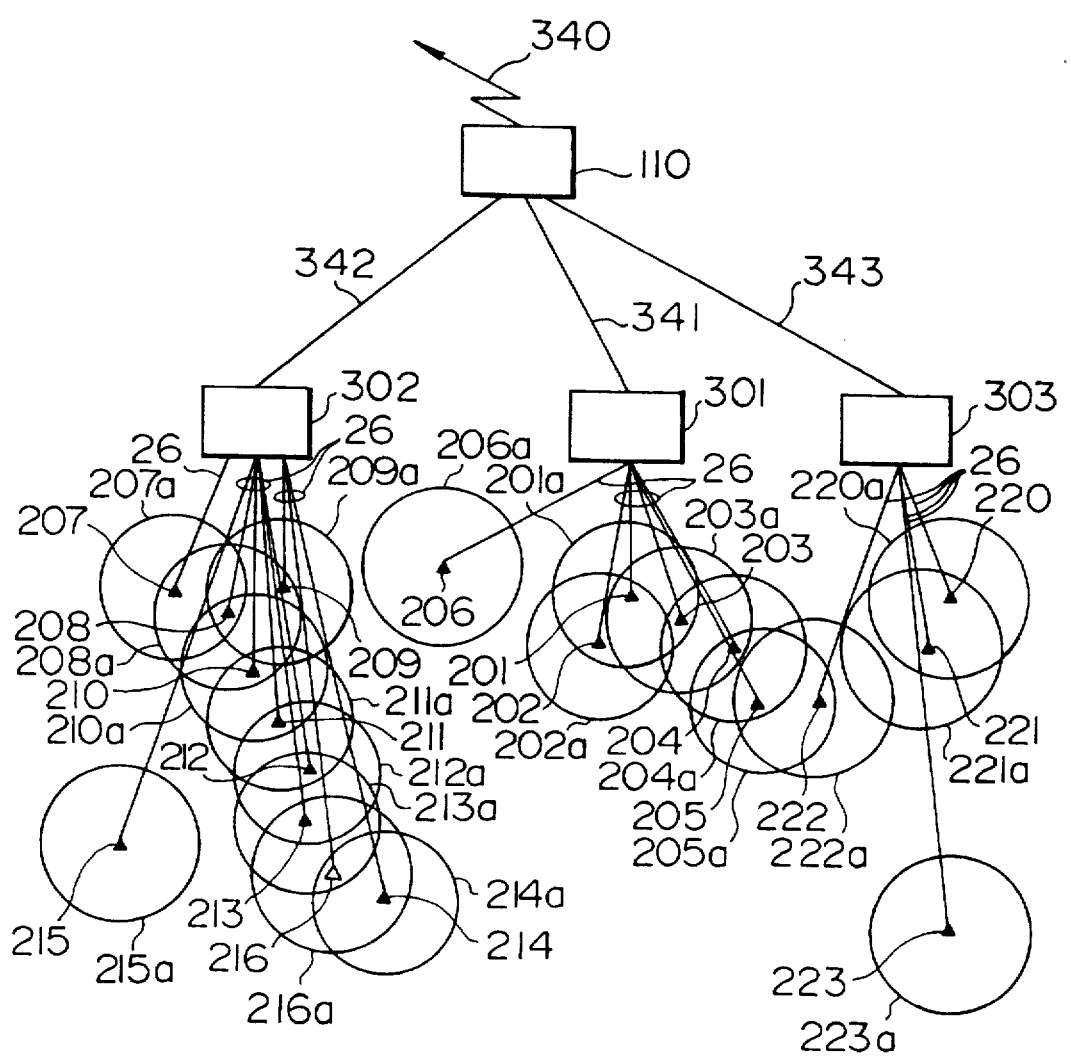
FIG. 8 is a diagram showing an example of a structure of service areas in a mobile radio communication system according to the present invention.

An embodiment of the present invention will be described with reference to FIGS. 1, 2 and 8. In a mobile radio communication system, for example, service zones covered by a plurality of radio base stations 201 to 205, respectively, overlap one another so as to form a multizone as shown in FIG. 8. Similarly, service zones covered by a plurality of radio base stations 207 to 213, respectively, also overlap one another so as to form another multizone. The radio base stations 201 to 205 are connected to a telephone exchange or a control station 301 through wire transmission lines 26, and communication between mobile stations located in service zones of different base stations is performed through the control station 301. Similarly, radio base stations 207 to 213 are also connected to a telephone exchange or a control station 302 through wire transmission lines 26, and communication between mobile stations located in service zones of different base stations is performed through the control station 302. The control stations 301 and 302 are connected further to a higher rank telephone exchange 110, and, for example, communication between a mobile station located in the service zone of the base station 201 and a mobile station located in the service zone of the base station 207 is performed through the control stations 301 and 302 and the higher rank telephone exchange 110.

Figure 2:
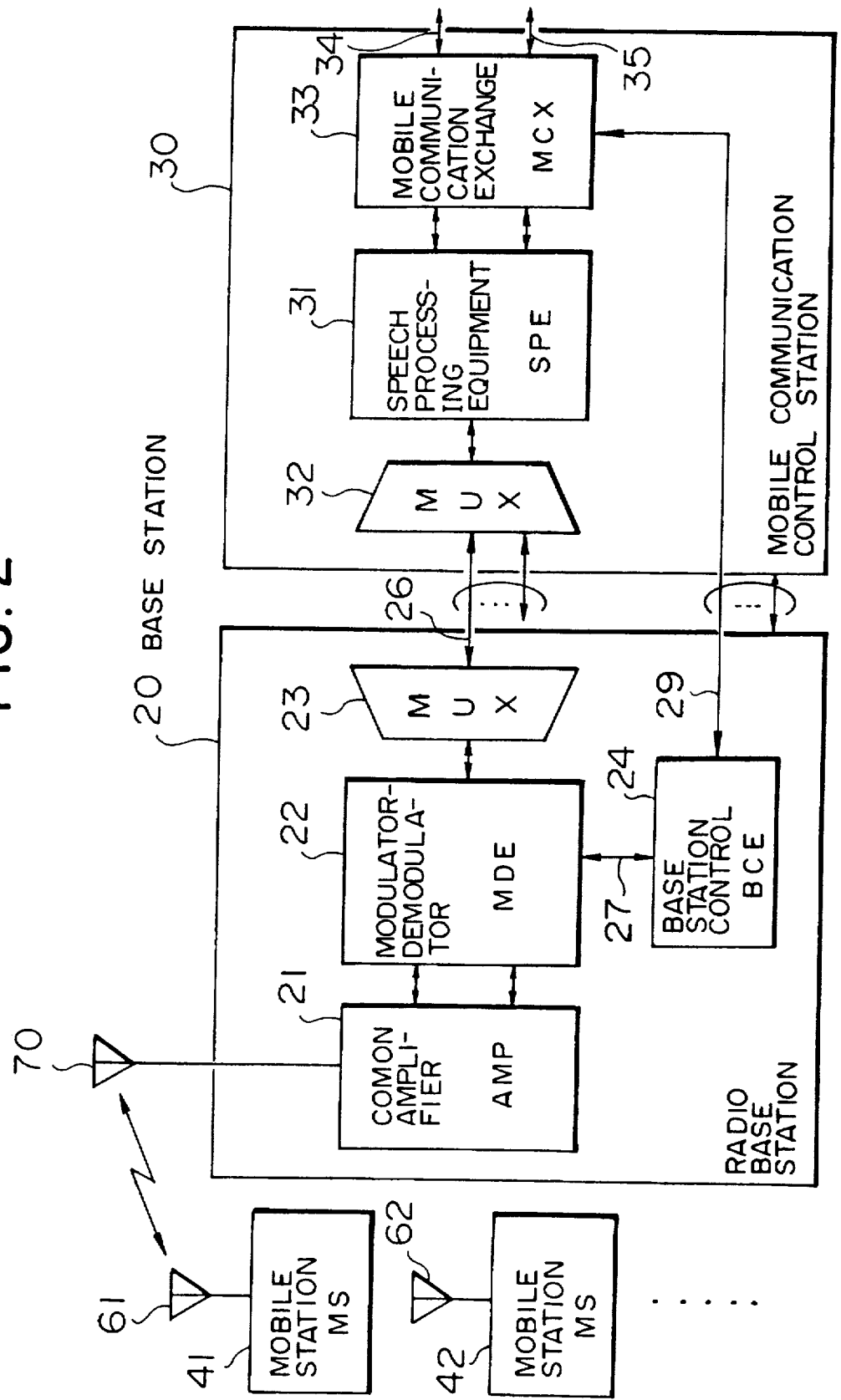
FIG. 2 is a block diagram showing structures of a radio base station and a communication control station of the mobile radio communication system in an embodiment of the present invention.

FIG. 2 shows a typical structure of one of the base stations and the higher rank control station in a mobile radio communication system as described above.

As shown in FIG. 2, a mobile radio communication system is provided with a base station (BS) 20, a mobile radio communication control station (MCC) 30 and mobile stations (MSs) 41, 42, and the like. Radio communications are set between mobile stations 41, 42, . . . and the radio base station 20 through antennas 61, 62, . . . provided for the mobile stations 41, 42, . . . and an antenna 70 provided for the radio base station 20. In this example of the structure, the mobile radio communication control station 30 is installed as a part of a private branch exchange, and is connected to the radio base station 20 through wire transmission lines 26 and 29.

A receiving signal received by the antenna 70 of the radio base station 20 is inputted to a multiplexer (MUX) 23 through a common amplifier (AMP) 21 and a modulator-demodulator (MDE) 22.

Communication between each of a plurality of base stations included in one multizone and the higher rank control station is performed for effective use of the transmission lines 26 by the TDMA system for instance by using a multiplex signal, which is obtained by allocating a plurality of slots provided in a communication signal of a predetermined digital form to the respective base stations, and by writing information to be communicated in the slots allocated to that base station. The multiplexer 23 stores a signal received by the base station from a mobile station located in its service zone and writes the signal in the allocated slots of the communication signal thereby converting the signal into a multiplex signal. The converted multiplex signal is transferred to the multiplexer (MUX) 32 in the control station 30 through the transmission line 26. The multiplex signal transferred into the multiplexer 32 is reconverted to the original signal before multiplexing, and is transferred to a mobile radio communication exchange (MCX) 33 through a speech processing equipment (SPE) 31. An output signal line 34 of the mobile radio communication exchange (MCX) 33 is connected to a public switched telephone network (PSTN).

A sent signal to be transmitted to a mobile station is inputted from the public switched telephone network to the mobile communication control station 30 and transferred to the base station 20 in a reverse direction through the respective equipment described above, and transmitted to a destined one of the mobile stations 41, 42, . . . from the antenna 70 after being processed for conversion by the respective equipment similarly to the above. The modulator-demodulator 22 and the mobile radio communication exchange 33 are controlled for various processings including synchronization by a base station control equipment (BCE) 24 through bidirectional digital signal lines 27 and 29. Various signals indispensable for maintenance, monitoring or the like are gathered or transmitted bidirectionally also through the digital signal lines 27 and 29 and a maintenance and monitoring signal line 35 as a data base of the public switched telephone network or the like, as occasion demands.

The base station control equipment (BCE) 24 includes a synchronization establishment control equipment which is described later with reference to FIG. 4 and performs, based on the received control signal or the broadcast signal, synchronization processing for making the timing of the broadcast signal transmitted from its own station coincident with the timing of the received broadcast signal.

Figure 3:
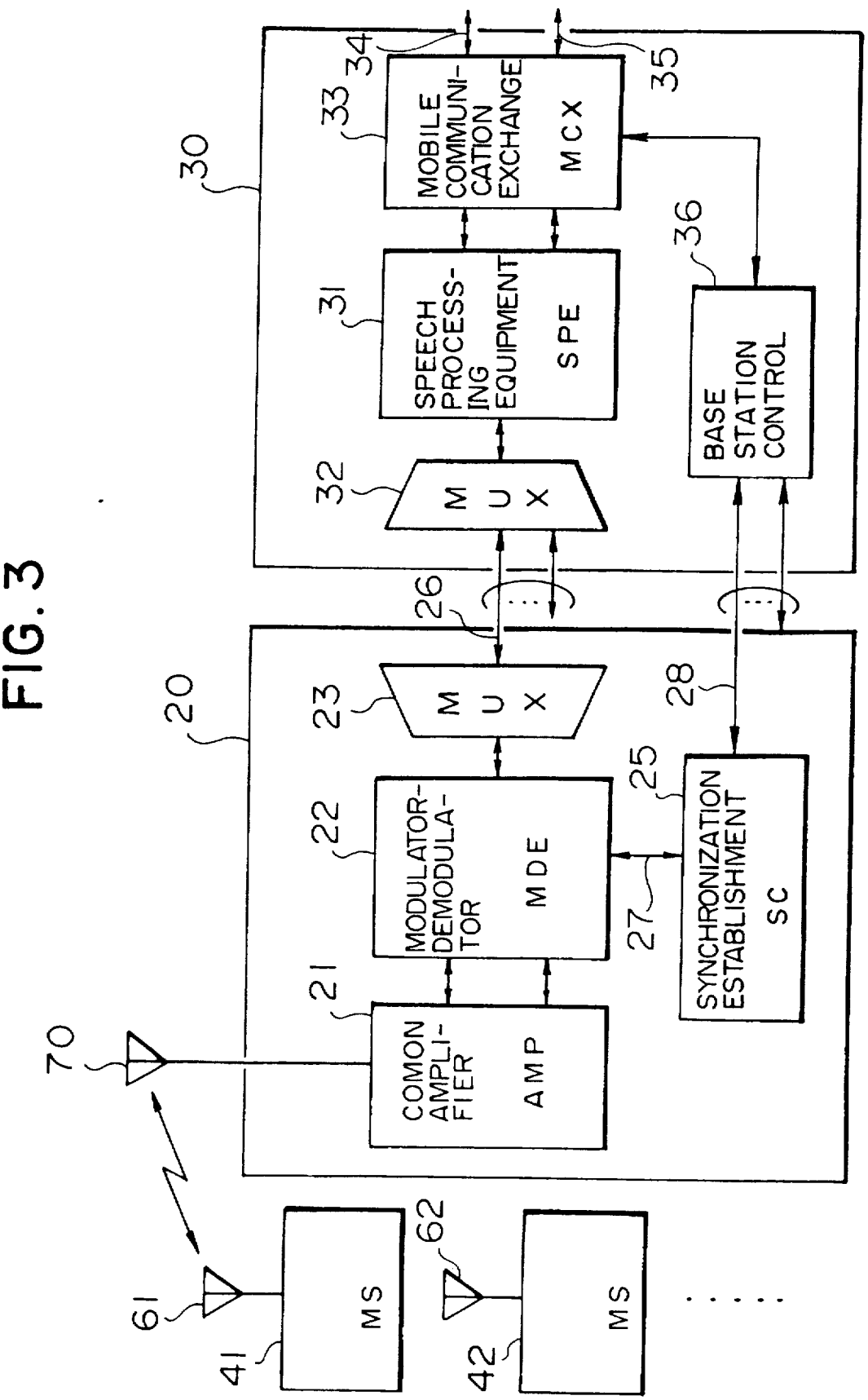
FIG. 3 is a block diagram showing a modified structure of the embodiment shown in FIG. 2.

FIG. 3 is a block diagram showing a modification of a mobile radio communication system of an embodiment according to the present invention. This modification is suitable for a small-scale radio base station, and the mobile radio communication control station 30 is installed in a subscriber's circuit of a local switchboard connected to a public switched telephone network. In FIG. 3, the same components as those in FIG. 2 are designated by the same reference numerals, and the descriptions thereof are omitted.

In a mobile radio communication shown in FIG. 3, only components related to synchronization control are separated from the base station control equipment (BCE) 24 shown in FIG. 2 and installed in the radio base station 20 as a synchronization establishment control equipment 25, and the other components are retained in the mobile radio communication control station 30 as a base station control equipment (BCE) 36. As a result of this modification, a control signal line 28 for connecting the base station control equipment 36 and the synchronization establishment control equipment 25 is newly required, but simplification, miniaturization and cost reduction of a radio base station which are the subjects of a microzone system becomes possible, thus making its practical use easy. A plurality of signal lines 26 and control signal lines 28, as shown in FIG. 3, are used for a plurality of base stations, respectively.

Figure 4:
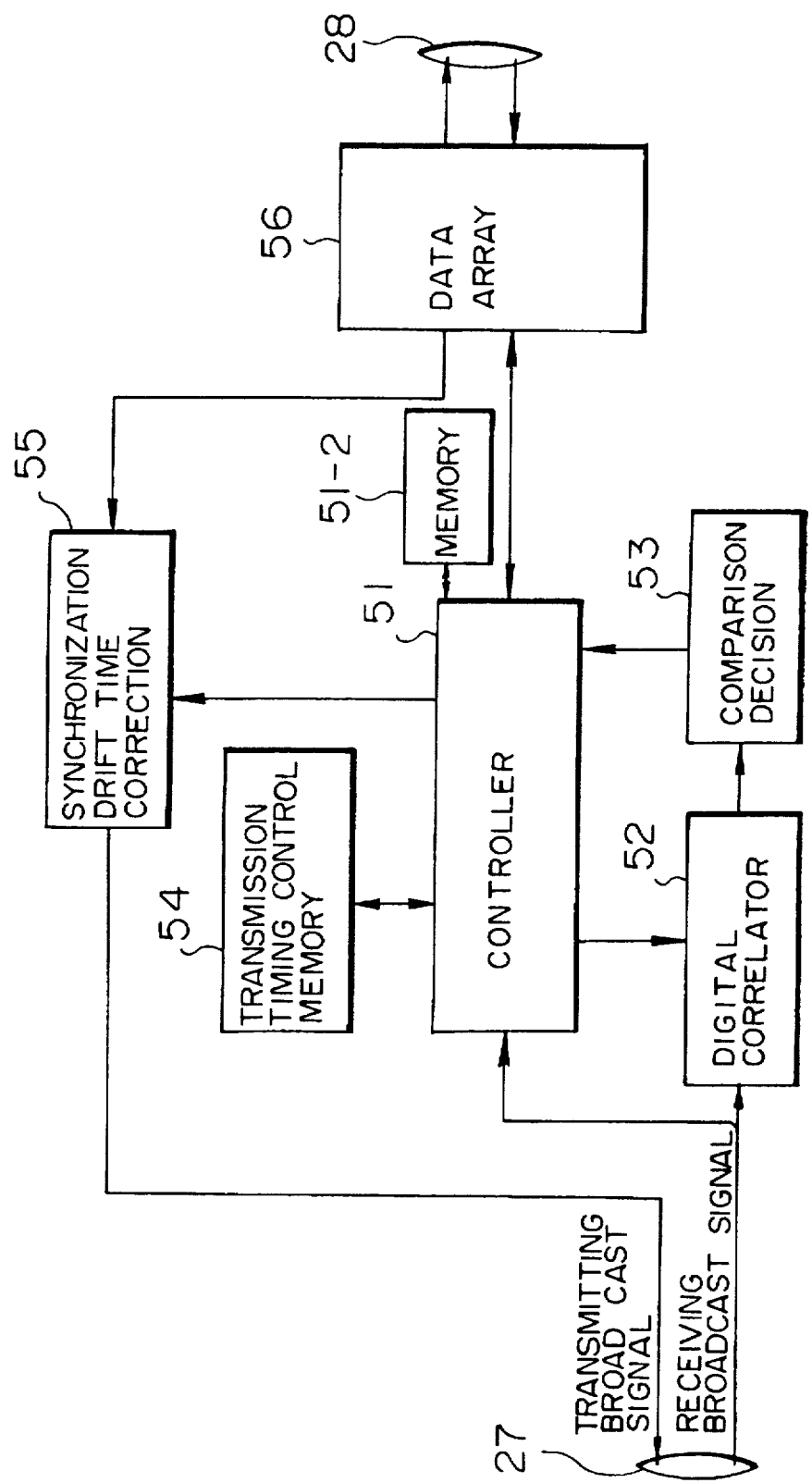
FIG. 4 is a block diagram showing a structure of the synchronization establishment control device shown in FIG. 3.

FIG. 4 is a block diagram showing an example of a structure of the synchronization establishment control equipment 25. A reference numeral 51 represents a controller, 51-2 a memory, 52 a digital correlator, 53 a comparison and decision circuit, 54 a transmission timing control memory, 55 a synchronization lag time correction circuit, and 56 a data array circuit. This synchronization establishment control equipment 25 performs, based on the broadcast signal outputted to the signal line 27 from the modulator-demodulator unit 22 shown in FIG. 3, synchronization for making the timing of transmission of the broadcast signal from its own station coincident with the timing of transmission of this received broadcast signal. The controller 51 also performs writing of synchronization establishing information into the transmitting broadcast signal and alteration thereof, and further stores the identification of the synchronized base station data and the propagation delay time in the memory 51-2.

Figure 5:
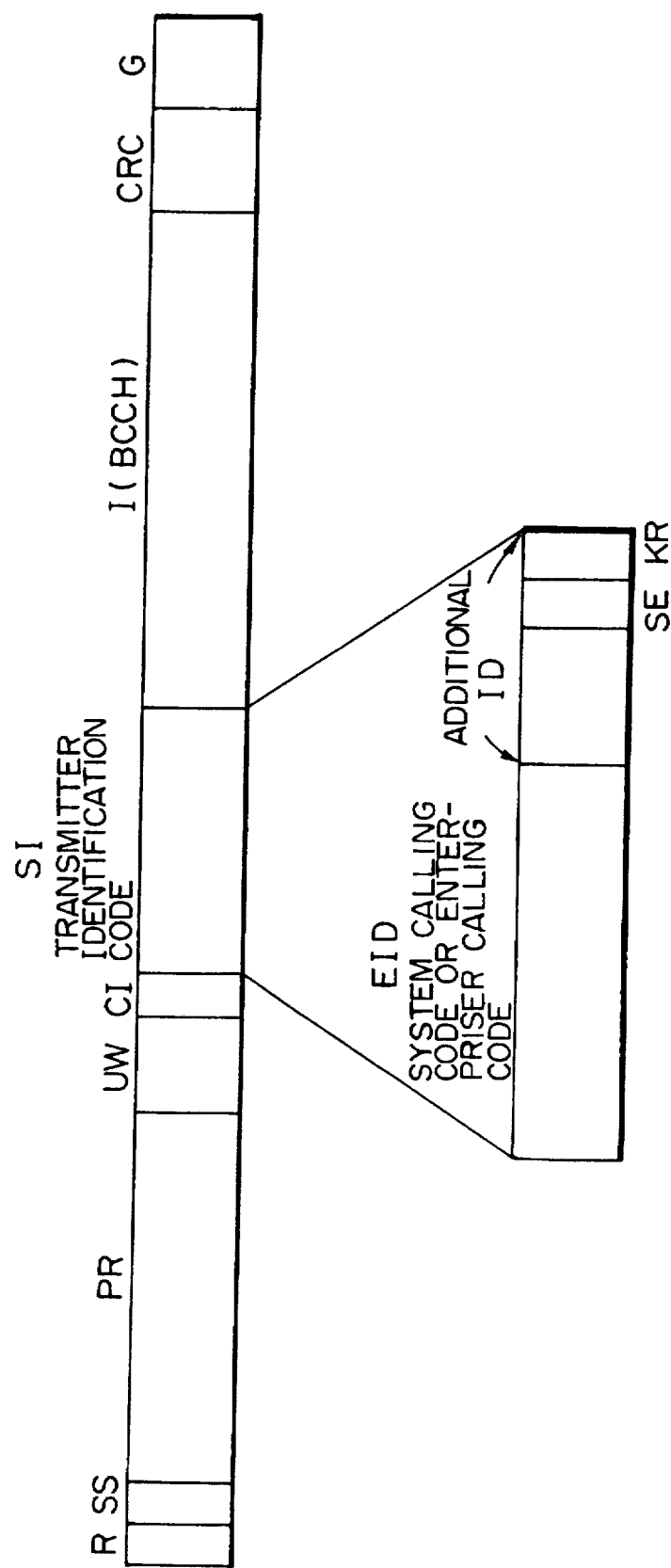
FIG. 5 is a diagram showing a format of a control signal used in the present invention.

The broadcast signal utilized for synchronization between the radio base stations is a digital control signal of a predetermined format transmitted intermittently at a predetermined constant period of approximately several seconds from each radio base station for notifying each of the mobile stations in its service zone of the zone where the mobile station is located. FIG. 5 shows an example of a structure of physical slots of the broadcast signal.

In FIG. 5, SS represents bits of a start symbol showing the head of the broadcast signal, R represents bits of response ramp time for allowing each mobile station to receive SS surely, PR represents bits of a preamble used for synchronization of data bits of the broadcast signal, UW represents unique word bits used for detecting frame synchronization, CI represents bits indicatng a channel used for data communication of the broadcast signal, SI represents bits indicating a transmitter identification code for identifying a transmitting base station, BCCH represents bits indicating various broadcast messages, CRC represents bits of a cyclic redundancy check code used for checking an error, and G represents guard bits for correcting timing shift between slots, and all of them are well known. The transmitter identification code SI further includes a system calling code or an enterprise calling code EID indicating identification of the system or enterprise related to the broadcast signal and an additional ID. A one-bit signal SE indicating the synchronization establishing state is included in the ID bits.

A synchronization establishment control processing utilizing the received broadcast signal, which is executed by the synchronization establishment control equipment 25 shown in FIG. 4, will be described with reference to the flow chart shown in FIG. 1. The processing shown in this flow chart may be executed by a microcomputer incorporated in the controller 51 shown in FIG. 4.

Upon application of a power supply to the system or detection of deviation of synchronization with another radio base station by a comparison and decision circuit 53 as described later during operation, the synchronization establishment control equipment 25 starts synchronization establishment control processing shown in the flow chart of FIG. 1. The controller 51 first inverts a self-contained flip-flop for holding synchronization establishing information of one bit indicating whether the station is in a synchronization establishing state with another radio base station or not from "1" (ON) to "0" (OFF) (step 1), and waits for reception of the broadcast signal (step 2).

When the broadcast signal is received, correlation between a unique word set by the controller 51 and a unique word included in the received digital broadcast signal outputted to the bidirectional control signal line 27 from the modulator-demodulator 22 shown in FIG. 3 is checked by the digital correlator 52. A disagreement between them only in a number of bits not larger than a predetermined number is determined as coincidence, and disagreement between them in a number of bits larger than the predetermined number is determined as dis-coincidence by the comparison and decision circuit 53. In the case of coincidence, notification is made of a fact that a broadcast signal has been received to the controller 51 from the comparison and decision circuit 53.

The controller 51 which has received notification that the broadcast signal is received checks the contents of the transmitter identification code included in the received broadcast signal (step 3), and judges the synchronization establishing information included therein (step 4). This synchronization establishing information is set to ON ("1") when the radio base station which has transmitted the received broadcast signal is in a synchronization established state with another radio base station, and set to OFF ("0") when the station is in a synchronization non-established state. When it is judged that the synchronization establishing information is set to "1" (step 5), the controller 51 executes synchronization with the radio base station which has transmitted the received broadcast signal and is in the synchronization established state (step 6).

The synchronization in the step 6 is executed by computing a lag time between a transmission timing of its the broadcast signal from the own station stored in its station transmission timing control memory 54 and a reception timing of the received broadcast signal, setting a corrected value of the lag time in a synchronization lag time correction circuit 55, and altering control data in the station transmission timing control memory 54 so as to cause the transmission timing of the own station to substantially coincide with the transmission timing of the transmitting base station from which the received broadcast signal has been transmitted. Here, a propagation delay time, or an accurate distance to the transmitting radio base station is required in order to accurately determine the transmission timing of the transmitting base station based on the reception timing of the received broadcast signal. In this embodiment, on the assumption that the distance to the transmitting radio base station is substantially equal to an average radius of the PHP zone, for example, 100 meters, the transmission timing of the own radio base station is corrected by, for example, 0.33 μs equal to the propagation delay time for the average radius thereby making the transmission timing of the own base station coincident with the transmission timing of the transmitting base station. When execution of the synchronization is ended, the controller 51 inverts the synchronization establishing information provided by the self-contained flip-flop from OFF ("0") to ON ("1") thus concluding synchronization establishment processing (step 7).

As to the propagation delay time described above, it may also be arranged such that propagation time of radiowave between the radio base station and each of the other existing base stations is measured or calculated from the positional relationship between them at a time when the radio base station is installed and is stored in a memory 51-2 connected to the controller 51, and the propagation delay time with respect to the transmitting base station of the received control signal is read out of the memory and used when synchronization processing is performed in the step 6. In such a case, it is required to correct the contents of the memory in case any base station is moved significantly after installation. In further detail, when a base station, which was once synchronized and made asynchronous for a reason such as disconnection of a power supply, is subjected again to a synchronizing processing, the efficiency of frequency utilization of broadcast signal should be low if the measurement of the propagation delay time of radiowave in the step 6 in FIG. 1 is repeated. Accordingly, the step 5 and the steps thereafter are modified as shown in FIG. 1B.

Figure 1:
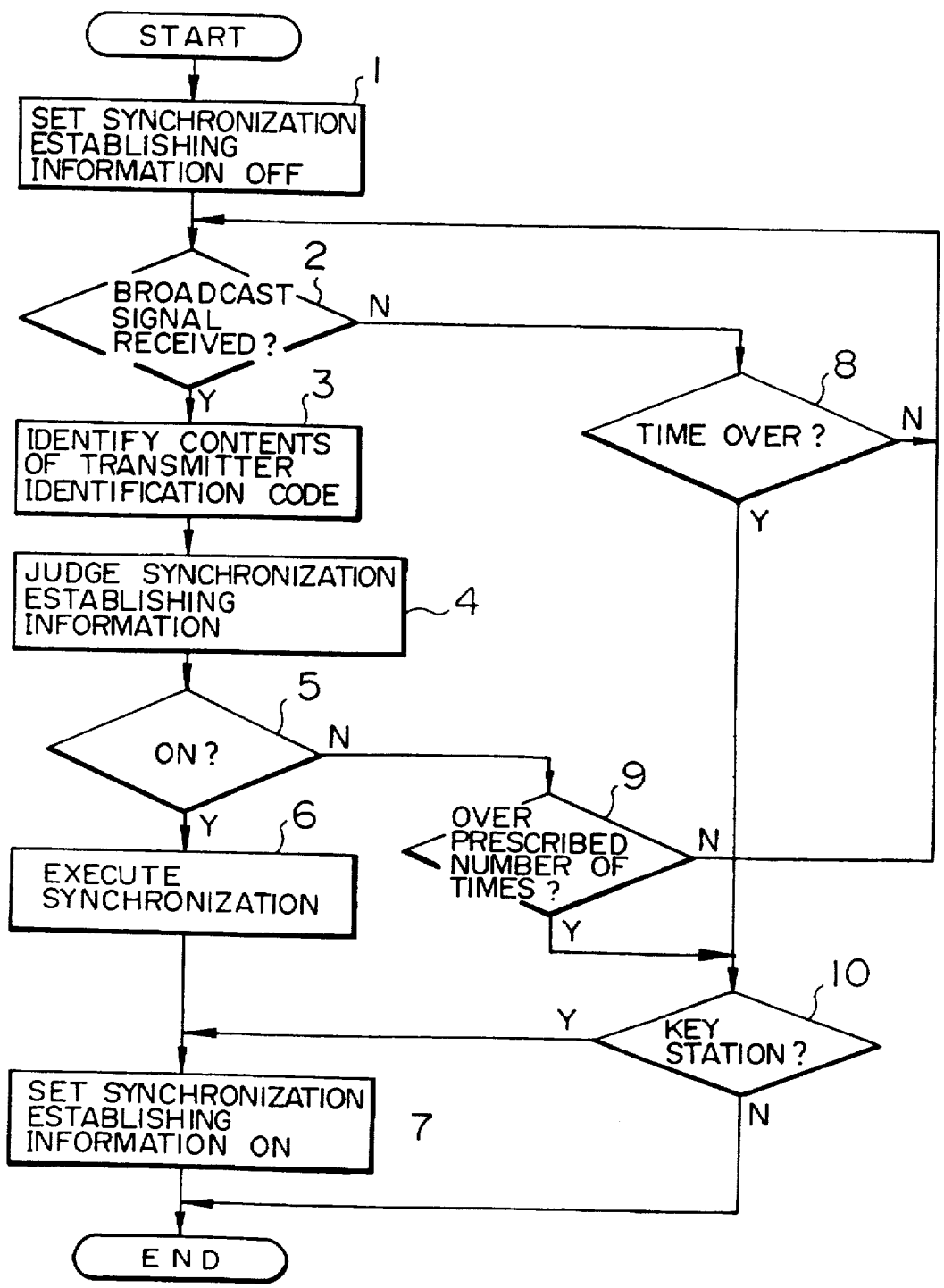
FIG. 1 is a flow chart showing processing of synchronization establishment in a mobile radio communication system in an embodiment of the present invention.

In the step 6 shown in FIG. 1, when measurement of the propagation delay time of radiowave between base stations is completed, the measured propagation time delay is stored in the memory 51-2 connected to the controller 51 shown in FIG. 4 together with the information for specifying the transmitting base station. Next, in the step 5 for discriminating the synchronization establishing information, when the synchronization establishing information of the transmitting base station is in an ON-state, the controller 51 investigates whether its own radio base station has ever established synchronization with the transmitting base station by reading the information in the memory 51-2 (step 14). When no information on the base station has been stored in the memory 51-2, the controller 51 executes synchronization in the step 6 similarly to FIG. 1. When the information on the transmitting base station has been stored in the memory 51-2, the controller 51 reads the radiowave propagation delay time out of the memory 51-2 (step 16), and executes synchronization by correcting the transmission timing of the own base station by the propagation delay time (step 18) so that the starting time in transmission of the control signal from the own base station coincides with the starting time in transmission of the control signal from the transmitting base station. Then, the controller 51 sets the synchronization establishing information to ON without measuring the propagation time again (step 7). With the above, it becomes unnecessary to always measure the radiowave propagation time at execution of synchronization as in step 6 in FIG. 1. This is based on such an idea that the power supply is sometimes interrupted after installation of the base station, but it is seldom that the installed location is altered greatly so that the propagation delay time must be changed.

When it is found that no broadcast signal is received within a predetermined period of time as the result of repetition of the steps 2 and 8, the controller 51 determines that no other radio base station forms a multizone with the own radio base station and shifts the process to step 10. Further, when it is detected that, although another radio base station forms a multizone with the own station, the other radio base station is also in a synchronization non-established state with any radio base station other than the own base station as the result of repetition of the steps 2 to 9, the controller 51 shifts the process to step 10.

The controller 51 determines whether the own station has been designated as a key station for synchronization (synchronizing key station) or not, and shifts the process to the step 7 when designated, and terminates the processing after setting the synchronization establishing information to ON ("1"). On the other hand, when it is determined in the step 10 that the own station is not designated as a synchronizing key station, the controller 51 terminates the synchronization processing while maintaining the synchronization establishing information to an OFF ("0") state without shifting to the step 7.

It is determined by a higher rank station at the time of installation of each radio base station whether the radio base station is designated as a synchronizing key station or not. It is also possible to designate two or more base stations as the key stations with different priorities. Information indicating whether the radio base station is designated as a key station or not, and indicating the priority when the radio base station is designated as the key station is written in specific bits KR of the additional ID in the broadcast signal as shown in FIG. 5. Sometimes cancellation or designation of the key station and change of the priority by control of a higher rank station occur after installation of any radio base station. In this case, the information in KR is rewritten.

As a result, when any radio base station called as a radio base station B which is not designated as a synchronizing key station receives a broadcast signal from another radio base station called as a radio base station A which is in a multizone state with the base station B and designated as the synchronizing key station, the radio station B executes synchronization with the synchronizing key station A. Another non-synchronizing key station called as a radio base station C which is in a multizone state with the radio base station B, which is synchronized with the synchronizing key station A, executes synchronization with the radio base station B upon receiving the broadcast signal transmitted from the radio base station B. In such a manner, synchronizations of peripheral radio base stations with the synchronization base station A are performed successively one after another.

In the above-described embodiment, correction of synchronization deviation is made by using radiowave propagation time at an average distance among a plurality of base stations forming a multizone or propagation delay time of radiowave between adjacent base stations which was obtained in advance and stored in a memory. In order to realize accurate synchronization between the base stations, however, it is necessary to obtain accurate propagation delay time of radiowave between the base stations. In another embodiment of the present invention, accurate propagation delay time of radiowave between the base stations is obtained in place of the propagation time of radiowave at an average distance among the base stations.

In a microcell mobile radio communication system, small-cell coverage zones, each having a radius of several hundred meters to several tens of meters are formed. Therefore, the propagation delay time required for the radiowave emitted from a certain base station to reach an adjacent base station is normally several hundred ns to several μs. The propagation delay time of this order is negligibly small as compared with a transmission speed of control data of a typical mobile radio communication system. For example, in a personal handy phone (PHP) expected to be put to practical use, the transmission speed of the control signal is 384 Kbps (period: approximately 2.6 μs). Since 100 meters to 200 meters are assumed as the cell radius in this case, the propagation delay time between adjacent base stations is approximately 0.33 μs to 0.66 μs.

There is also a problem in an autonomous system of mutual synchronization between base stations described in Akaiwa et al., the Institute of Electronic Information Communication Engineers in Japan, National Spring meeting 1991, B-344 and an Autumn meeting 1991 B-251. Namely, in a recent mobile radio communication system, a system for increasing or decreasing transmitting power at a base station in accordance with increase or decrease of the traffic has been proposed as described in the Institute of Electronic Information Communication Engineers, Spring Meeting 1992, B-319 or the like. In this case, however, a frame phase is deviated with increase or decrease of the transmitting power at each base station, thereby producing an error in a measured value of the signal timing, and making synchronization correspondingly inaccurate. Furthermore, even when the average transmitting power is neither increased nor decreased, there is a problem that the frame phase is deviated with sudden fluctuation of the transmitting power caused by transmission of radiowave in a burst form at respective slots in a TDMA system.

Generally, in a mobile radio communication system, the control of transmitting power at a base station has a tendency to become still more complicated in consideration of effective utilization of frequencies, accommodation of handover function to a high-speed moving carrier and the cell radius of a microcell (in other words, an average receiving level of radiowave) changes dynamically depending on conditions such as traffic and site factors and selection of the frequency to be utilized and is not constant. In particular, in a future mobile radio communication system by the TDMA system, a system in which large-cell converage zones (macrocells) each having a radius of 1 Km to 15 Km corresponding to an existing car telephone system and microcells are mixed (overlaid) has been proposed. With regard to synchronization among the base stations in such an overlay system, the synchronization error produced by the propagation delay time or the like, which is not completely compensates, is larger than the synchronization error produced by fluctuation of the frame length between the base stations, which is derived from frequency deviation of a crystal oscillator in each base station. Besides, it is difficult in principle to compute the distance between the base stations from a receiving level, and it is still more difficult to compute it based on a radiowave (an interference wave) delayed by multipath reflection.

Figure 6:
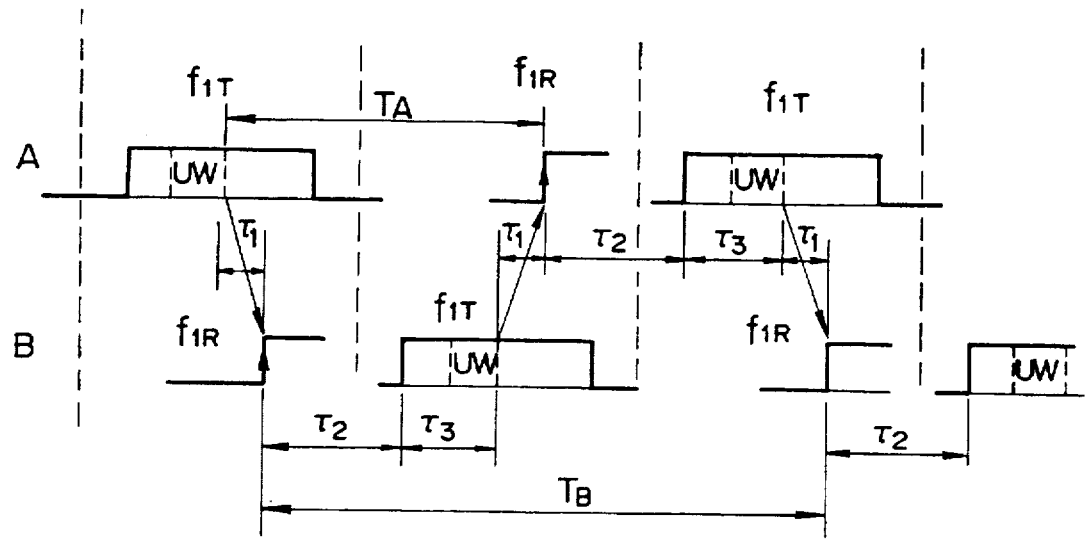
FIG. 6 is a diagram for explaining processing for measuring radiowave propagation delay time used for synchronization establishment in a mobile radio communication system according to another embodiment of the present invention.

An example of a method of measuring accurate propagation delay time of radiowave between base stations which is employed in the present invention will be described with reference to FIG. 6.

First, for adjacent base stations A and B which have mutually formed a multizone, the propagation delay time is measured using a common control channel $f_1$. Suffixes T and R added to $f_1$ in the figure indicate uses for transmission and reception, respectively. In the adjacent radio base stations A and B, previous arrangements are made as to the frequency $f_1$ of the control channel used for the measurement of the propagation delay time between the base stations such as a predetermined slot of the broadcast signal and the communication steps of procedure prior to commencement of the measurement of the propagation delay time. In the example shown in FIG. 6, it is assumed that the base station A is in the synchronization established state, and the base station B executes synchronization with the base station A.

When it is assumed that the propagation delay time of radiowave between the base stations A and B is $\tau_1$, a unique word (UW) included in the broadcast signal transmitted from the base station A is detected by the base station B with a delay of $\tau_1$. The base station B starts transmission of a broadcast signal including a unique word at a lapse of a predetermined period of time $\tau_2$ after detecting the unique word transmitted from the base station A, and this broadcast signal is detected by the base station A with a delay of the propagation delay time $\tau_1$. The base station A transmits a broadcast signal including the unique word to the base station B again at a lapse of predetermined time after detection of the unique word. Here, it is assumed that the base stations A and B are operated by the same hardware and software. In this case, the time $\tau_2$ from detection of the unique word included in the received broadcast signal to the start of transmission of a next broadcast signal and the time $\tau_3$ from start of transmission of the broadcast signal to the end of transmission of the unique word are not different for the two stations.

Accordingly, the time $T_B$ from the base station B detecting the unique word transmitted from the base station A to the base station B again detecting the unique word is obtained by referring to FIG. 6, as follows.

$$T_B = \tau_2 + \tau_3 + \tau_1 + \tau_2 + \tau_3 + \tau_1 \quad (1)$$
$$= 2\tau_1 + 2(\tau_2 + \tau_3)$$

From the expression (1), the propagation delay time $\tau_1$ is obtained as follows.

$$\tau_1 = T_B/2 - (\tau_2 + \tau_3) \ldots (2)$$

As described above, $\tau_1 + T_3$ may be regarded as a constant value when the jitter or the like is neglected.

It may also be arranged so that the propagation delay time is measured at the base station A in place of the base station B, and the results of measurement are forwarded to the base station B utilizing an appropriate control channel. In this case, when it is assumed that the time interval from the time when the base station A terminates transmission of the unique word to the time when the base station A detects the unique word transmitted from the base station B is $T_A$, the following expression is obtained.

$$\tau_1 = T_A/2 - (\tau_2 + \tau_3)/2 \quad (3)$$

Furthermore, the system may be structured so that average values of $T_B$ and $T_A$ covering a plurality of frames are measured by repeating the communication sequence of the broadcast signal including the unique word in a plurality of times consecutively, and the propagation delay time $\tau_1$ is calculated from the expressions (2) and (3) based on the average values of $T_A$ and $T_B$. With this structure, more accurate propagation delay time in which the influence of fluctuation of $\tau_2 + \tau_3$ by jitter or the like is reduced can be measured.

Further, when $\tau_2$ differs depending on the radio base station due to the differences of software and/or hardware, between the radio base stations, it may be structured so that a value of $\tau_2$ in each base station is forwarded to an adjacent radio base station by including the value in a control signal or the like.

Figure 7:
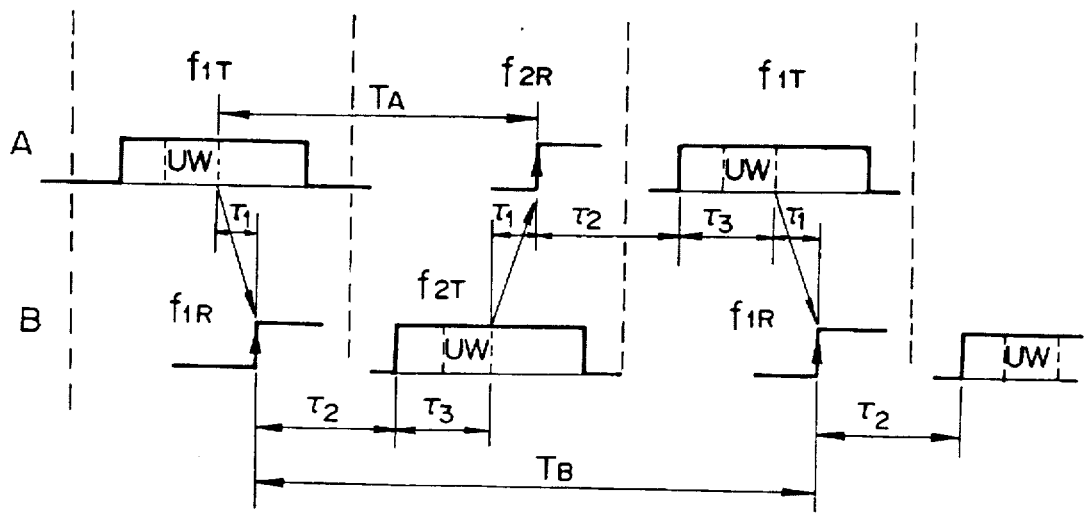
FIG. 7 is a diagram for explaining modification of processing for measuring radiowave propagation delay time shown in FIG. 6.

FIG. 7 shows another example of a method of measuring a radiowave propagation delay time.

In FIG. 7, two control channels of appropriate frequencies $f_1$ and $f_2$ are allocated in advance to the communication sequence for measuring the propagation delay time, and these control channels are used alternatively. In this method, although it takes time for switching the control channels, it is possible to measure the propagation delay time in a manner similar to the case shown in FIG. 6 by setting the value of $\tau_2$ including the time required for switching.

FIG. 8 is a typical diagram showing a structural example of service areas of a mobile radio communication system according to the present invention. In FIG. 8, a lower rank exchange 301 such as a PBX and a terminal exchange and mobile radio communication control stations 302 and 303 are connected to a higher rank exchange 110 through communication lines 341, 342 and 343. The higher rank exchange 110 is connected further to a higher rank exchange network through a signal line 340. The radio base stations 201 to 205 such as telephone sets belonging to respective houses and public telephone sets accommodated in the lower rank exchange 301 through signal lines 26 (including signal lines 29 in FIG. 2 and signal lines 28 in FIG. 3) are arranged while forming multizones mutually including the other radio base stations in respective service zones 201a to 205a thereof. However, a radio base station 206 accommodated in the lower rank exchange 301 includes no other radio base station in a service zone 206a thereof.

On the other hand, radio base stations 207 to 213 accommodated in the mobile radio communication control station 302 through the signal lines 26 are arranged while forming multizones mutually including other radio base stations in respective service zones 207a to 213a thereof. However, radio base stations 214 and 215 connected to the mobile radio communication control station 302 include no other radio base station in respective service zones 214a and 215a thereof. A service zone 216a is that of a radio base station 216 accommodated in the mobile radio communication control station 302 which is installed later.

Further, radio base stations 220 to 222 accommodated in the mobile radio communication control station 303 through the signal lines 26 are arranged while forming multizones mutually including other radio base stations in respective service zones 220a to 222a thereof. In particular, the radio base station 222 is arranged in a state that the radio base station 205 accommodated in other lower rank exchange 301 is included in the service zone 222a thereof. Besides, no other radio base station is included in a service zone 223a of a radio base station 223.

In the mobile radio communication system shown in FIG. 8, the radio base stations 201 to 205 and the radio base station 222 in a multizone state with contiguous zones are synchronized with a synchronizing key station included in them appropriately. Further, the radio base stations 220 and 221 in a multizone state are mutually synchronized with each other, and the radio base stations 207 to 213 in a multizone state are also mutually synchronized with each another. Further, the radio base stations 206, 214, 215 and 223 which are not in a multizone state with any of adjacent base stations are operated in an asynchronous state with other radio base stations.

It is assumed that a telephone set with a child set (a PHP) is newly installed in this state as the radio base station 216 accommodated in the mobile radio communication control station 302. This newly installed radio base station 216 forms a multizone with the adjacent radio base station 213 which has been already shifted to a synchronized state, and is shifted to a synchronized state with the radio base station 213 when receiving a broadcast signal from the radio base station 213. The radio base station 214 is shifted to a synchronized state with the radio base station 216 when a broadcast signal is received from the radio base station 216 which has shifted to the new synchronized state. When the radio base station 216 is newly added, the peripheral radio base stations which form a multizone with this station 216 are shifted successively one after another.

Even in the case of a synchronizing key station, when the key station is shifted to an asynchronizing state due to some reasons such as switching-on of power, the key station executes synchronization upon receiving the broadcast signal transmitted from another key station which is in the synchronized state or another synchronizing non-key station which is synchronized with the synchronizing key station which is in the synchronized state so that the key station is again shifted to the synchronized state through the synchronized key or non-key station.

Figure 1A:
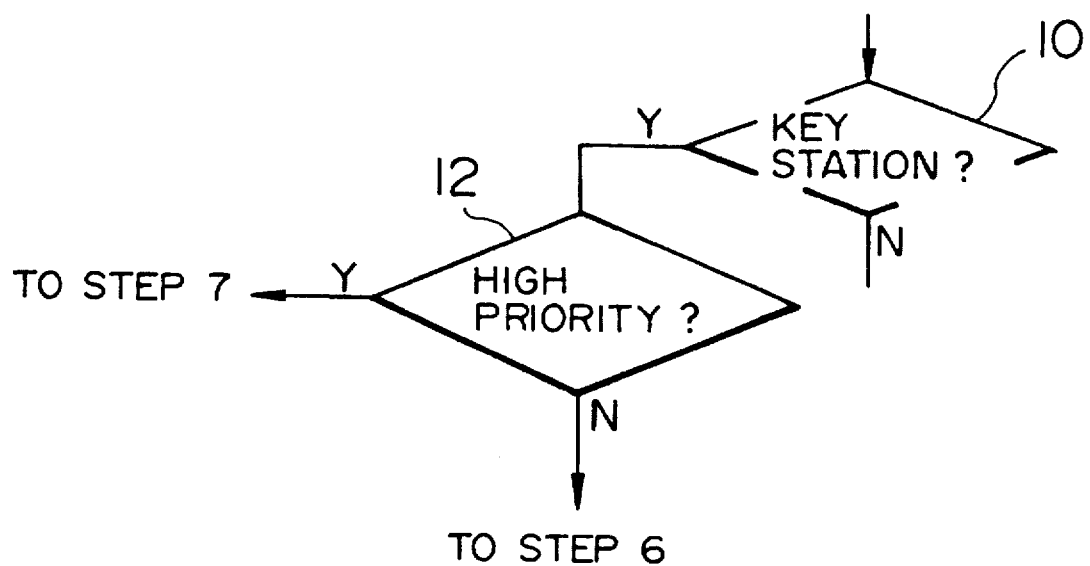
FIG. 1A is a flow chart showing a modified portion in an example in which a part of the flow chart shown in FIG. 1 is modified.
Figure 1B:
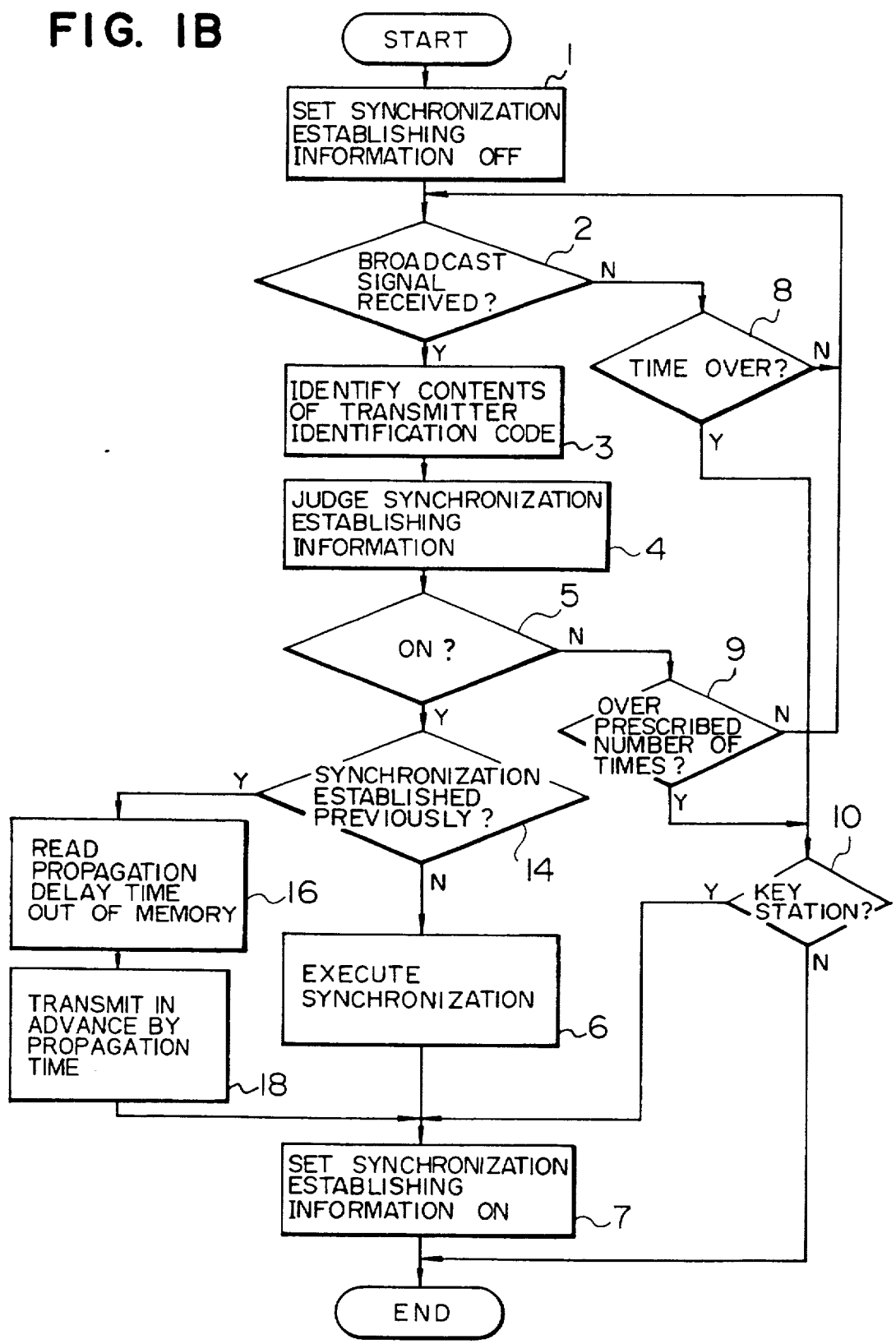
FIG. 1B is a flow chart showing processing of synchronization establishment in a mobile radio communication system in another embodiment of the present invention.

The processing in case of two priority stages in designation of synchronizing key station, where each station is designated as a key-station or non-key station has been described. But there is a possibility that no synchronization is performed at all among a plurality of non-synchronizing key stations which are in a multizone state while separating apart from the synchronizing key station. In order to prevent the above, the priorities are designated to a plurality of key stations as described previously. When a non-synchronizing key station cannot be synchronized over a predetermined number of times, the step 10 and the following steps in FIG. 1 are changed as shown in FIG. 1A. Namely, when the receiving base station and the transmitting base station are both synchronizing key stations in the step 10, the process proceeds to the step 12, and it is determined whether the priority of the receiving base station is higher than the priority of the transmitting base station. When the priority of the receiving base station is higher than the priority of the transmitting base station, the process proceeds to the step 7. When the priority of the receiving base station is lower than the priority of the transmitting base station, the process proceeds to the step 6 and the receiving base station establishes synchronization with the transmitting base station. With this, the problems described previously are solved.

Further, when the service zone of a microcell is rapidly expanded to merge with independent service zone, synchronization is established at a lapse of a certain period of time by having the synchronizing key station in the independent service zone synchronized with the synchronizing key station of the original service zone in advance or by inverting the synchronization establishing information of all the radio base stations within the independent service zone from ON ("1") to OFF ("0").

Alternatively, multi-stage priorities, such as a plurality of different degrees of priority for key station may be allotted to the respective radio base stations and the degree of the priority allotted to each transmitting radio base station is included in the synchronization establishing information included in the broadcast signal transmitted from the transmitting radio base station. In such a case, the receiving radio base station compares, in the step 4, the degree of priority indicated by the synchronization establishing information included in the broadcast signal which the receiving radio base station has received with the degree of priority allotted to the receiving radio base station.

Further, various structures described below are applicable for shortening the period of time required for synchronization establishment between radio base stations. Those are: a structure that, while a plurality of carriers are allocated to a normal broadcast signal, the period of time required for the radio base station on the receiving side to detect the received broadcast signal is shortened by allocating a specific carrier among those carriers to the broadcast signal utilized for synchronization establishment; a structure in which only a specific radio base station such as a synchronizing key station transmits the broadcast signal for synchronization establishment; and a structure in which a repetitive period of a broadcast signal transmitted for every several frames is set to the minimum repetitive period (such as a period corresponding to a super frame in a PHP).

Furthermore, a case of the TDMA system has been explained, but it is apparent that the present invention is applicable not only to the TDMA system, but also to the CDMA system in point of synchronization between base stations in a small zone structure by a digital system.

As described in detail above, according to a method of establishing synchronization between radio base stations of the present invention, it is structured so that the propagation delay time of radiowaves between adjacent base stations is actually measured and synchronization is established based on the actually measured value. Thus, the synchronization among respective radio base stations can be realized with very high precision in fluctuation degree caused by the jitter of the transmit-receive equipment in respective radio base stations.

Further, according to a mobile radio communication system of the present invention using the method of establishing synchronization described above, synchronization among respective radio base stations which have been brought into a multizone state is established autonomously. Thus, it is possible to realize a mobile radio communication system including a personal radio communication system or the like for making an interference detecting function and an interference avoiding function effective, and in turn, aiming at effective utilization of frequencies.

Further, since successive synchronization establishment control of a microcell becomes possible, it is also possible to finally cover all the service zones with microcells in which synchronization has been established because the synchronization is established with microcells in the service zones successively even in the case of enlargement of the service region of a microcell system.

Furthermore, the control for zone switching becomes easier by synchronization among radio base stations in hand-off or the like. In particular, according to the present invention, when the radio base station of the microcell system is installed additionally one after another on the basis of selling by the piece, synchronization among radio base stations is established autonomously and automatically without requiring the addition of special circuits. Accordingly, synchronization can be established surely among a plurality of enterprizers or in radio base stations located around a high traffic area, and radio line control in the use of the same terminal covering homes, business places and outdoors (public) is made easier and more effective.

I claim:

1. A method of establishing synchronization between radio base stations in a mobile radio communication system comprising the steps of:

including, in a control signal transmitted at a predetermined time interval from each of the radio base stations, a synchronization establishing information indicating whether its own radio base station is in a first state in which synchronization has been established between its own radio base station and any other of the radio base stations or in a second state in which the synchronization has not yet been established;

determining, in a receiving radio base station, which is one of the radio base stations and has received the control signal transmitted from a transmitting radio base station, which is any other of the base stations, and when said receiving radio base station is in the second state, whether the synchronization establishing information included in the received control signal indicates the first state or the second state;

establishing, in the receiving radio base station, synchronization with the transmitting radio base station, when it is determined that the synchronization establishing information included in the received control signal indicates the first state;

setting, after establishing the synchronization with the transmitting radio base station, the synchronization establishing information included in the control signal transmitted from the receiving radio base station to indicate the first state;

selectively designating a key station with respect to each of the radio base stations; and setting, in each of the radio base stations which is in the second state and does not receive the control signal, which is transmitted from any other of the radio base stations and includes the synchronization established information indicating the first state, for a period of time longer than a predetermined time interval, the synchronization establishing information included in the control signal to be transmitted from said own radio base station to a state indicating the first state when said own radio base station is designated as the key station, and to a state indicating the second state when said own radio base station is not designated as the key station.

2. A method according to claim 1, wherein the step of establishing synchronization includes a step of correcting a transmission starting time of the control signal from said receiving radio base station based on a radiowave propagation time between said receiving radio base station and said transmitting radio base station.

3. A method according to claim 2, wherein said radiowave propagation time between said receiving radio base station and said transmitting radio base station is predetermined based on a size of a zone covered by the receiving radio base station.

4. A method according to claim 2, wherein said radiowave propagation time between said receiving radio base station and said transmitting radio base station is determined based on a predetermined and stored radiowave propagation time between said receiving radio base station and each of the radio base stations.

5. A method according to claim 2, wherein said radiowave propagation time between said receiving radio base station and said transmitting radio base station is determined by repeating transmission of a predetermined signal at a predetermined time interval between said receiving radio base station and said transmitting radio base station and measuring a time required for the predetermined signal to make one round transmission between said receiving and transmitting radio base stations.

6. A method according to claim 1, wherein the designation of said key station is made when each of the radio base stations is installed.

7. A method according to claim 1, further comprising the steps of: designating a priority along with the designation of the key station for each of the radio base stations; including a priority signal indicating the designated priority in said control signal transmitted from the radio base station to which the priority is designated; and establishing synchronization with said received control signal in said receiving radio base station when the priority indicated by the priority signal included in the received control signal is higher than the priority of said receiving radio base station.

8. A mobile radio communication system having a plurality of radio base stations, each of the radio base stations comprising:

means for including, in a control signal transmitted at a predetermined time interval from the radio base station, synchronization establishing information indicating whether the own radio base station is in a first state in which synchronization has been established between the own radio base station and any other of the radio base stations or in a second state in which the synchronization has not yet been established;

means operative, when the radio base station is a receiving radio base station and one of the radio base stations and has received the control signal transmitted from a transmitting radio base station which is any other of the radio base stations, for determining whether the synchronization establishing information included in the received control signal indicates the first state or the second state;

means operative, when the radio base station is the receiving radio base station and is in the second state, for establishing synchronization with the transmitting radio base station, when it is determined that the synchronization establishing information included in the received control signal indicates the first state;

means for setting, after establishing the synchronization with the transmitting radio base station, the synchronization establishing information included in the control signal transmitted from the receiving radio base station to indicate the first state; and wherein each of the radio base stations is selectively designated in advance as a key station or a non-key station, and wherein each of the radio base stations further comprises means operative when the radio base station is in said second state and does not receive the control signal transmitted from the transmitting radio base station with the synchronization establishing information indicating the first state for a time longer than a predetermined period of time for setting said synchronization establishing information included in the control signal transmitted from the own radio base station to a state indicating said first state when the own radio base station is designated as the key station, and to a state indicating said second state when the own radio base station is designated as the non-key station.

9. A mobile radio communication system according to claim 8, wherein said means for establishing synchronization includes means for correcting a transmission starting time of the control signal from said receiving radio base station based on a radiowave propagation time between said transmitting radio base station and said receiving radio base station.

10. A mobile radio communication system according to claim 9, wherein said correcting means includes means for determining the radiowave propagation time between said receiving radio base station and said transmitting radio base station from a time predetermined based on a size of a zone covered by the receiving radio base station.

11. A mobile radio communication system according to claim 9, wherein said correcting means includes means for determining the radiowave propagation time between said receiving radio base station and said transmitting radio base station based on a predetermined and stored radiowave propagation time between said receiving radio base station and each of the other radio base stations.

12. A mobile radio communication system according to claim 9, wherein said correcting means includes means for determining the radiowave propagation time between said receiving radio base station and said transmitting radio base station by repeating transmission of a predetermined signal at a predetermined time interval between said receiving radio base station and said transmitting radio base station, and measuring a time required for the predetermined signal to make one round transmission between said receiving and transmitting radio base stations.

13. A mobile radio communication system according to claim 8, wherein said designation of the key station is made when each of the radio base stations is installed.

14. A mobile radio communication system according to claim 8, wherein said control signal transmitted from the transmitting radio base station includes a priority signal indicating a priority in designation of the key station of said transmitting radio base station, and wherein each of the radio base stations further comprises means operative, when the radio base station is the receiving radio base station, for establishing synchronization with said received control signal when the priority indicated by the priority signal included in the received control signal is higher than the priority of said receiving radio base station.

15. A mobile radio communication system having a plurality of radio base stations, comprising:

a first radio base station having means for transmitting a first radio signal including synchronization establishing information indicating that said first radio base station has established synchronization with any other of the plurality of radio base stations, the first radio signal being transmitted at a predetermined time interval; and a second radio base station which is in a state in which the synchronization has not yet been established and having means for receiving the first radio signal transmitted from said first radio base station and for transmitting a second radio signal synchronized with the succeeding first radio signal transmitted from said first radio base station, wherein each of said first and second radio base stations is selectively designated in advance as a key station or a non-key station and said second radio base station further comprises means operative when said second radio base station has not established the synchronization with any other of the radio base stations and does not receive the first radio signal for a time longer than a predetermined period of time for setting synchronization establishing information included in said second radio signal to a first state indicating that said second radio base station has established the synchronization when said second radio base station is designated as the key station and to a second state indicating that the synchronization has not been established when said second radio base station is designated as the non-key station.

16. A mobile radio communication system according to claim 15, further comprising correcting means for correcting a starting time of transmission of said second radio signal from said second radio base station based on a radiowave propagation time between said first radio base station and said second radio base station.

17. A mobile radio communication system according to claim 16, wherein said correcting means includes means for determining the radio wave propagation time between said first radio base station and said second radio base station from a time predetermined based on a size of a zone covered by said second radio base station.

18. A mobile radio communication system according to claim 16, wherein said correcting means includes means for determining the radio wave propagation time between said first radio base station and said second radio base station based on a predetermined and stored radiowave propagation time between said first radio base station and said second radio base station.

19. A mobile radio communication system according to claim 16, wherein said correcting means includes means for determining the radio wave propagation time between said first radio base station and said second radio base station by repeating transmission of a predetermined signal at a predetermined time interval between said first radio base station and said second radio base station, and measuring a time required for the predetermined signal to make one round transmission between said first radio base station and said second radio base station.

20. A mobile radio communication system according to claim 15, wherein said designation of the key station is made when each of said first and second radio base stations is installed.

21. A mobile radio communication system according to claim 15, wherein each of the first and second radio signals includes a priority signal indicating a priority in designation of the key station of the associated radio base station and said second radio base station further comprises means for establishing the synchronization with said first radio base station when the priority signal included in the first radio signal indicates the priority of said first radio base station is higher than that of the second radio base station.

22. A mobile radio communication system having a plurality of radio base stations, comprising:

a first radio base station having means for transmitting a first radio signal including synchronization establishing information indicating that said first radio base station has established synchronization with any other of the plurality of radio base stations, the first radio signal being transmitted at a predetermined time interval;

a second radio base station having means for receiving the first radio signal transmitted from said first base station and for transmitting a second radio signal synchronized with the succeeding first radio signal transmitted from said first radio base station; and means operative when the second radio base station has not established the synchronization with any other of the radio base stations and does not receive the first radio signal for a time longer than a predetermined period of time for setting synchronization establishing information included in said second radio signal to a state indicating that the synchronization has not been established.

* * * * *